Sept. 27, 1932.　　G. KRELL ET AL　　1,879,326
SPEED TRANSFORMER
Original Filed March 15, 1930　　3 Sheets-Sheet 1

INVENTOR
George Krell
Guy M. Martinet
BY
ATTORNEY

Sept. 27, 1932.     G. KRELL ET AL     1,879,326
SPEED TRANSFORMER
Original Filed March 15, 1930    3 Sheets-Sheet 3

INVENTOR
George Krell
Guy M. Martinet
BY
ATTORNEY

Patented Sept. 27, 1932

1,879,326

UNITED STATES PATENT OFFICE

GEORGE KRELL, OF SAPULPA, AND GUY M. MARTINET, OF TULSA, OKLAHOMA; SAID MARTINET ASSIGNOR TO SAID KRELL

SPEED TRANSFORMER

Application filed March 15, 1930, Serial No. 436,066. Renewed June 13, 1932.

Our invention relates to speed transformers, and more particularly to a mechanism for transmitting power of a prime mover to variable working loads, the principal object of the invention being to enable the prime mover, operating at its normal rated speed, to handle variable loads at speeds proportional to the loads.

It is a further object of the invention to allow acceleration of the prime mover to its working speed before starting the load.

In accomplishing these and other objects of the invention, we have provided improved details of structure, the preferred form of which is illustrated in the accompanying drawings, wherein.

Figure 1:
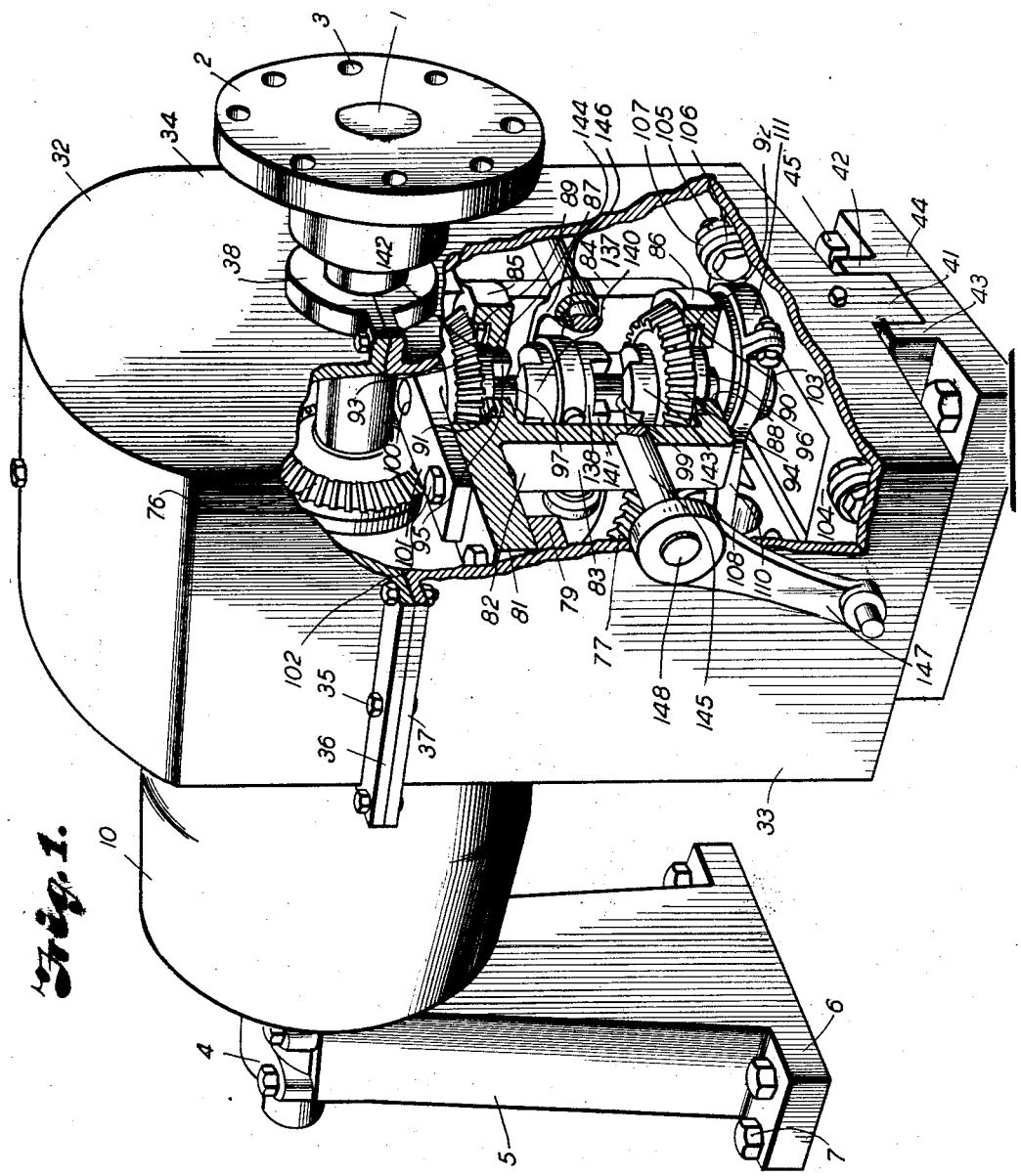
Fig. 1 is a perspective view of a speed transformer constructed in accordance with our invention, part of the gear housing being broken away to illustrate the mechanism for controlling the speed and direction of rotation of the driven member.

Referring more in detail to the drawings:

The transformer illustrated is particularly designed for use in connection with standard oil well drilling rigs for letting in and pulling casings, tubing and tools, for pumping wells and for other hoisting purposes, and in the present instance includes a shaft 1, having a flanged coupling 2 keyed thereto, and provided with bolt openings 3 through which bolts are extended to secure the shaft to the power shaft of a prime mover such as an internal combustion engine (not shown).

The shaft 1 is rotatably mounted at its opposite end in a bearing 4 supported in alignment with the connection to the prime mover by a bracket 5, having laterally extending feet 6, through which bolts 7 or the like may be projected for securing the bracket to a foundation or other suitable support.

A thrust collar 8 is sleeved on the shaft adjacent the bearing 4 and secured in contact therewith by a set screw 9 extending through the collar and engaging the shaft to prevent longitudinal movement of the shaft in relation to the bearing.

A driven member, preferably a pulley 10, having a hub 11, is rotatably mounted on the shaft 1 on anti-friction bearings 12 and 13 at opposite ends of the hub. The bearings preferably comprise tapered rollers 14 running between outer races 15 that are snugly received in a bore 16 of the hub, and inner races 17 that are pressed on the shaft, the outer races of each bearing being spaced apart by a sleeve 18 having a press fit on the bore 16 of the hub, and the inner races positioned by a sleeve 19 pressed on the shaft 1. A chamber 20 is thus provided between the sleeves for containing lubricant for the bearings, which may be supplied to the chamber through a fill pipe 21 threaded into the hub 11 in communication with the chamber through a port 22 in the sleeve 18, and having a plug 23 at its open end for retaining the lubricant within the chamber. To prevent the lubricant from leaking around the bearings, the inner end of the hub 11 is provided with an internally extending flange 24, against which the bearing 13 abuts, and the outer end of the hub is closed by a stuffing box 25, including a washer 26 sleeved on the shaft and supported in contact with the bearing 12 by a packing plate 27 fixed to the pulley by machine bolts 28, suitable packing 29 and 30 being inserted between shouldered portions 31 of the washer and the plate to prevent escape of lubricant around the shaft.

As before mentioned, the pulley is freely mounted on the shaft but is adapted to be driven thereby through a planetary gear mechanism or driving member now described.

32 designates a housing for enclosing the gear mechanism, comprising a rectangular base member 33 and a substantially semi-cylindrical cover member 34 which is secured to the base member by bolts 35 extending through mating flanges 36 and 37 on said members, as illustrated in Fig. 1.

The shaft 1 extends through the housing and is rotatably mounted in a bearing 38 in the side of the housing adjacent the coupling 2, half of which is formed in the cover member 34 and the other half in the base 33. Formed in the opposite side of the housing concentric with the shaft is a bearing 39 of larger diameter than the shaft to receive a member 40 for connecting the pulley in driving relation with the planetary gear mechanism contained within the housing. The housing thus provides additional bearing for the shaft and is retained in alignment with the bearing 4 by a downwardly projecting rib 41 extending longitudinally across the bottom of the base, as shown in Fig. 1. The rib engages between spaced ears 42 and 43 projecting upwardly from an anchor plate 44 which is bolted to the foundation by bolts 45. The housing is constructed grease tight to contain lubricant for the planetary gears and for furnishing oil to a hydraulic pump later described.

The connector 40 is sleeved on the shaft 1 and includes a cylindrical bearing portion 46 rotatably received in the bearing 39 and having a cylindrical recess 47 in its outer end to receive the end of the pulley hub 11 which is keyed therein by a spline 48 received in a groove 49 in the pulley hub and in an aligning groove 50 in the connector member.

Extending from the inner end of the connector member is a bearing sleeve 51 of smaller diameter than the bearing portion 46, and cooperating therewith is a similar sleeve 52 also sleeved on the shaft and spaced from the first named sleeve to mount a planetary gear carrier 53.

Figure 2:
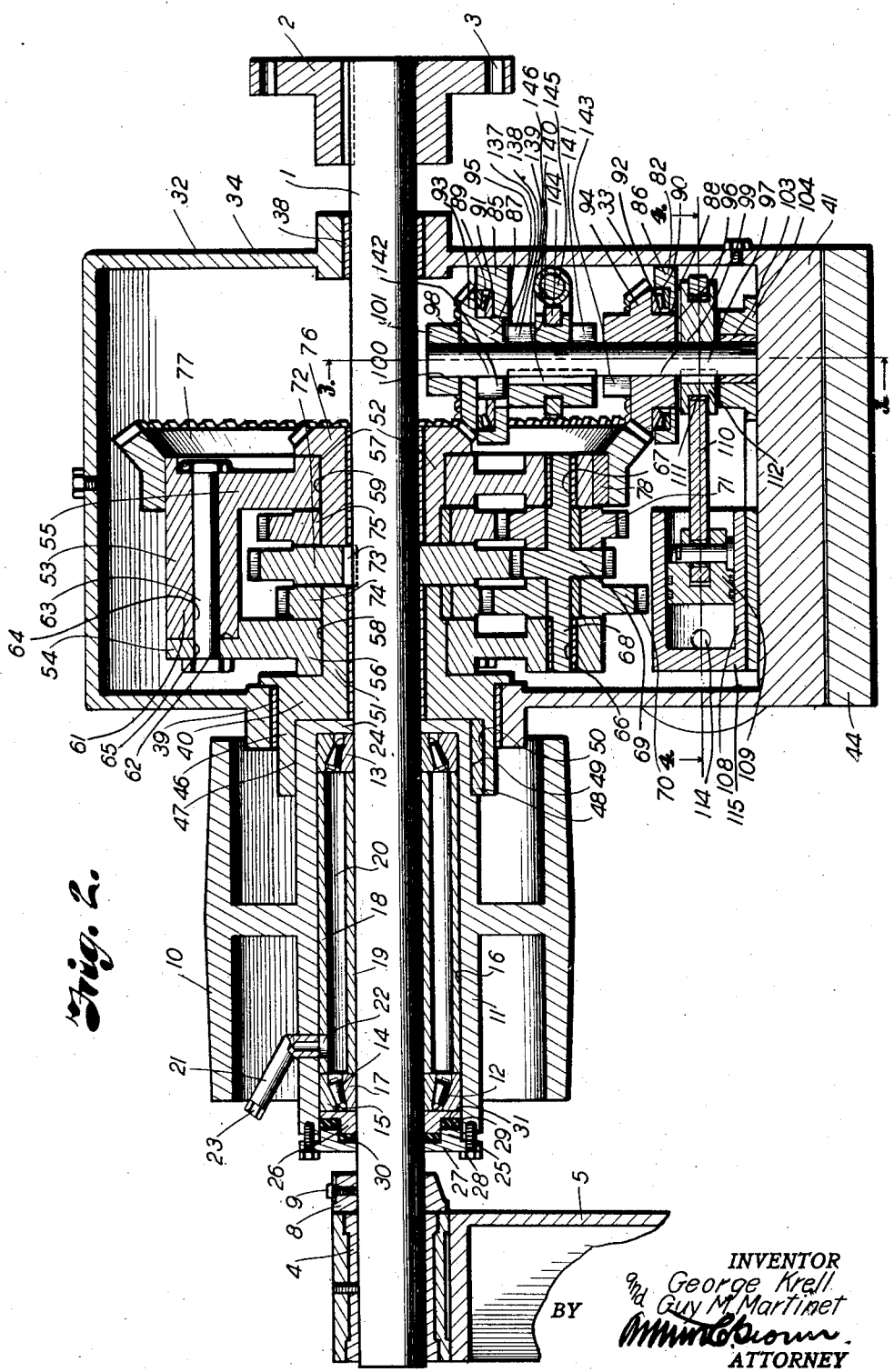
Fig. 2 is a longitudinal, vertical, sectional view through the transformer.

The gear carrier 53 is adapted for rotation on the bearing sleeves at speeds differential to the speed of the shaft 1, and comprises disk-shaped end members 54 and 55 having concentric hubs 56 and 57 provided with bearing openings 58 and 59 for receiving the bearing sleeves 51 and 52. The disks 54 and 55 are spaced apart to accommodate sets of planetary gears by lugs 61 extending from the face of one of the disks and engaging in notches 62 formed in the face of the opposite disk, as best illustrated in Fig. 2.

The disks are secured together by bolts 63 extending through openings 64 in the lugs 61 and through aligning openings 65 provided in the opposite disk.

Formed in the disks adjacent their peripheries are aligning bearing openings 66 and 67 for mounting shafts 68 of the planet gear sets, each comprising a centrally positioned gear 69, preferably formed integral with the shaft 68, and keyed to the shaft at opposite sides of the gear are gears 70 and 71, each having a diameter differential to the gear 70, that is, the gears 69 and 71 are preferably larger than the gear 69, and the gear 70 is larger than the gear 71.

The planetary gear sets thus described are driven from the shaft 1 through a sun gear 72 meshing with the central planet gears 69 and keyed to the shaft by a spline 73 at a point between the bearing sleeves 51 and 52 so that rotation of the shaft actuates the gears 70 and 71, which, in turn mesh respectively with a gear 74 keyed on the sleeve 51 of the connector and a gear 75 keyed to the sleeve 52 for driving a bevel gear 76 preferably formed integral with the sleeve 52.

It is apparent that with the gearing thus far described and with the pulley belted to a load, the sun gear 72 drives the planet gear 69, and the gear carrier, being free to move, will rotate about the axis of the shaft 1, and rotation of the planet gear 69 will rotate the gear 70 which planetates about the gear 74.

It is further apparent that if a brake is applied to the planetary gear carrier to stop its rotation, the sun gear 72 will rotate the gear 69 on its axis and the planetary gear 70 meshing with the gear 74 will directly drive the pulley instead of planetating about the axis of the shaft, and it is also apparent that if rotation of the planetary gear carrier is controlled by the braking means, the pulley 10 may be driven at variable speeds.

Therefore, in order to control planetation of the planetary gears, we provide the gear carrier with a ring gear 77 which is keyed thereto by a spline 78 and which is geared to a control mechanism now described.

Supported by lugs 79 and 80, projecting inwardly from opposite sides of the housing, is a bar 81 carrying a substantially rectangular frame 82 including depending plates 83 and 84 supporting spaced horizontal plates 85 and 86 adjacent the teeth of the gears 76 and 77 respectively. The plates 85 and 86 are provided with aligning openings 87 and 88, and formed in the upper faces of the plates concentric with the openings are recesses 89 and 90 receiving roller bearing sets 91 and 92 for rotatably mounting bevel gears 93 and 94, having hubs 95 and 96 projecting through the openings 87 and 88 in the plates. The gears mesh respectively with the gears 76 and 77 and are adapted for selectively driving a shaft 97 which extends through openings 98 and 99 concentric of the gears.

Figure 3:
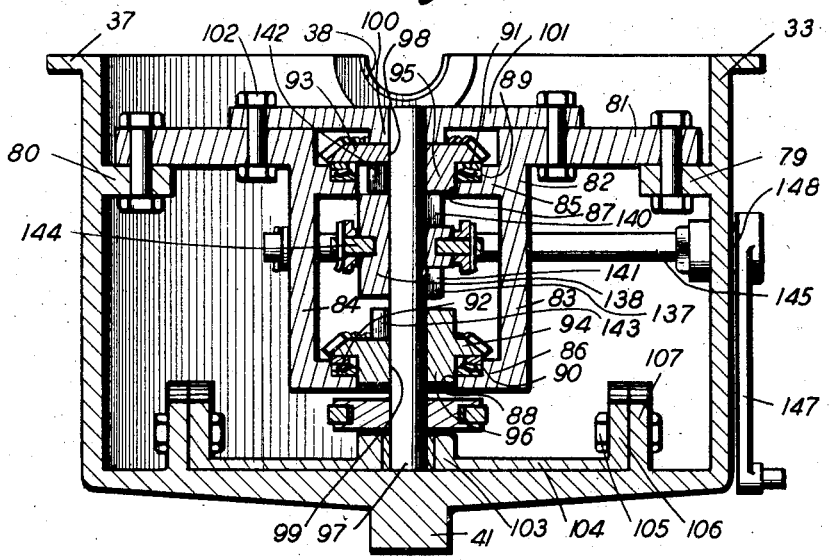
Fig. 3 is a cross sectional view on the line 3—3, Fig. 2, illustrating the gear and clutch mechanism for controlling the planetary gearing.
Figure 4:
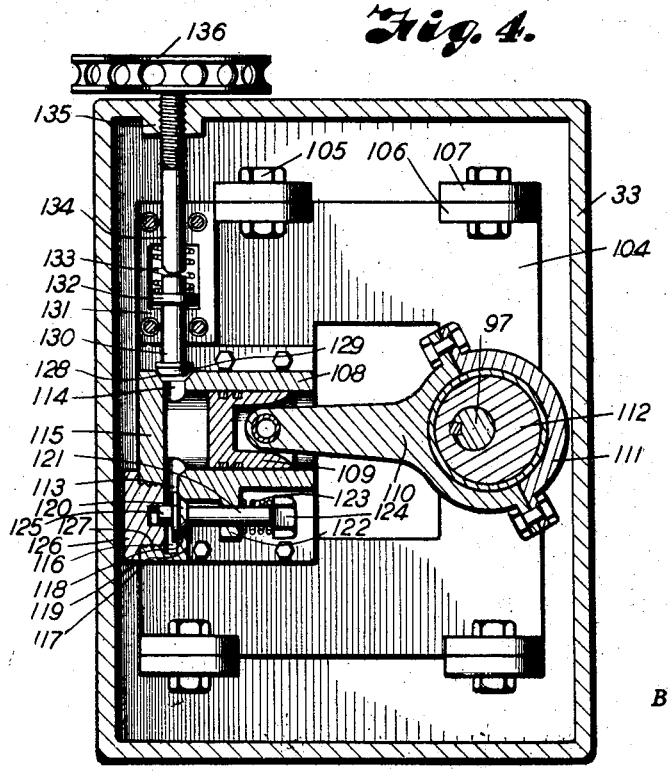
Fig. 4 is a horizontal, sectional view on the line 4—4, Fig. 2, illustrating the hydraulic mechanism for controlling the planetary gearing.

The shaft is rotatably mounted at its upper end in a bearing 100 carried by a plate 101 extending over the upper gear and secured to the bar 81 by bolts 102 with its lower end rotatably mounted in a bearing 103 carried by a plate 104 supported on the bottom of the housing. The plate 104 is secured by bolts 105 to ears 106 on the plate and ears 107 projecting upwardly from the bottom of the housing as best shown in Fig. 3.

Bolted to the plate 104 opposite the gears 93 and 94 is a pump cylinder 108 containing a piston 109 actuated by a connecting rod 110 which is connected by a strap 111 with an eccentric disk 112 on the shaft 97, so that when the shaft is rotated by either one of the gears the piston is reciprocated in the cylinder. The cylinder is provided with inlet and outlet ports 113 and 114 respectively located in the walls of the cylinder adjacent its head 115. The inlet port 113 communicates with a valve chamber 116 formed in a lateral extension 117 of the cylinder, and formed in one side of the chamber is a valve seat 118 closed by a valve 119 adapted to open on the suction stroke of the piston to permit a charge to be drawn into the cylinder and to close on the compression stroke. The valve is preferably of the poppet type and includes a valve head 120 seating on the seat 118 formed in the cylinder extension, and a stem 121 slidably mounted in a lug 122 projecting from the side of the cylinder in line with the extension 117.

The valve is normally retained closed by a spring 123 sleeved over the stem and having one end engaging the lug and the other engaging against a nut 124 threaded on the free end of the stem. The head of the valve is also provided with a pilot stem 125 slidable in a plug 126 which is threaded into the cylinder head to close an opening 127 through which the valve is inserted into the chamber.

The outlet port 114 is located diametrically opposite to the intake port and is controlled by a valve 128 including a head 129 adapted to close the port, and a stem 130 which is slidably mounted in a guide member 131 bolted to the plate 104 adjacent the side of the cylinder. Fixed on the end of the stem is a collar 132 that is engaged by a compression spring 133 to normally retain the valve on its seat, but which allows the valve to open on the discharge stroke of the piston.

In order to control effective opening of the valve, we provide an adjustable stop for limiting movement of the valve comprising a rod 134 having one end threaded through a boss 135 in the housing, and the other end extending through the guide member to engage the end of the stem 130. The rod is actuated by a wheel 136 fixed to the threaded end of the rod exteriorly of the housing so that the rod may be threaded to and from the valve stem for limiting opening of the valve.

Normally the rod is adjusted to allow free opening of the valve, permitting unrestricted flow of fluid through the pump so that comparatively no resistance is offered to rotation of either the gear 76 or the ring gear 77 when the pulley is under load and its rotation is zero. However, should the outlet port be restricted by limiting opening of the valve, the liquid being forced through the reduced outlet, offers resistance to the piston and slows down rotation of the gear carrier or reverses rotation of the pulley as later described, depending on which of the gears 93 or 94 is engaged with the shaft 97 through a clutch 137.

The clutch 137 is preferably of the tooth type and includes a sleeve 138 slidably keyed to the shaft by a spline 139 and having teeth 140 and 141 at its ends for engaging similar teeth 142 and 143 on the hubs of the gears. The clutch is shifted by a yoke 144 fixed on a rock shaft 145 by a key 146, the shaft being rotatably mounted in the housing and actuated exteriorly thereof by a lever arm 147 fixed on a projecting end 148 of the shaft.

Assuming that the shaft 1 is connected to a prime mover and the pulley is belted to a working load, the operation of the speed transformer is as follows:

To operate the pulley in a forward direction at low speed, the wheel 135 is rotated to allow the outlet valve 127 to open its full extent and permit free discharge of fluid through the pump. The gear carrier is then free to rotate and the gear 70 will planetate about the gear 74. The clutch 137 is then shifted to engage the gear 94 so that the pump is actuated by means of the ring gear 77 on the gear carrier. Opening of the outlet valve is then gradually limited by manipulation of the wheel 136 to restrict flow through the pump, which causes retardation of the planetary gear carrier and correspondingly controls planetation of the gear 70 about the gear 74. Controlled planetation of the gear 70 starts rotation of the gear 74 and the pulley. As the discharge from the pump is further restricted the pulley correspondingly increases its speed until the outlet is entirely closed when the pulley has attained its maximum speed, since the gear 70 has then ceased its planetation and is rotating on a fixed axis to drive the pulley at a speed governed by the ratio of the gears 69, 70, 72 and 74, inclusive.

In order to obtain reverse gear the clutch is shifted to engage the gear 93 which then drives the pump through the bevel gear 76 on the sleeve 52 and rotation of the gear 76 is controlled in the same manner as the speed of the gear carrier was controlled. Planetation of the gear 71 is governed by controlled rotation of the sleeve 52 through the pump, which, due to the diametrical pitch of the respective gears, produces reverse rotation of the pulley.

Neutral position is obtained by positioning the clutch in neutral position between the gears.

What we claim and desire to secure by Letters Patent is:

1. Speed transforming mechanism including a driving shaft, a driven member, an actuator fixed to the driven member and rotatable independently of the shaft, a driving gear wheel fixed to said actuator, a master gear wheel fixed to the shaft, a retarding gear member rotatable on the shaft, a gear wheel fixed to said retarding gear member, a gear carrier rotatable about the shaft, connected gear wheels journaled on the carrier and meshing respectively with the driving gear wheel, the master gear wheel, and the gear wheel fixed to the retarding gear member for driving the driven member reversely at speeds proportional to restriction of freedom of rotation of the retarding gear member, and means for restricting freedom of rotation of the retarding gear member including means for positively connecting said restricting means with the retarding gear member.

2. Speed transforming mechanism including a driving shaft, a driven member, an actuator for the driven member freely rotatable on the shaft, a driving gear wheel fixed to said actuator, a master gear wheel fixed to the shaft, a retarding gear member rotatable on the shaft, a gear wheel fixed to said retarding gear member, a gear carrier rotatable about the shaft, connected gear wheels journaled on the carrier and meshing respectively with the driving gear wheel, the master gear wheel and the gear wheel fixed to the retarding gear member, for driving the driven member forwardly at speeds proportionate to restriction of freedom of rotation of the gear carrier when the retarding gear member is free to rotate, and for driving the driven member reversely at speeds proportional to restriction of freedom of rotation of the retarding gear member when the gear carrier is free to rotate, and means for selectively restricting freedom of rotation of the gear carrier and the retarding gear member including means for positively connecting said restricting means with the gear carrier and the retarding gear member.

3. A speed transforming mechanism including a driven member, a driving shaft extending through the driven member, an actuator fixed to the driven member and freely rotatable on the shaft, a driving gear wheel fixed to said actuator, a master gear wheel fixed to the shaft, a gear carrier rotatable about the shaft, connected gear wheels journalled on the carrier and meshing respectively with the driving and master gear wheels for driving the driven member forwardly at speeds proportionate to restricting of freedom of rotation of the gear carrier, and hydraulic means for selectively restricting freedom of rotation of the gear carrier.

4. A speed transforming mechanism including a driven member, a driving shaft extending through the driven member, an actuator for the driven member freely rotatable on the shaft, a driving gear wheel fixed to said actuator, a master gear wheel fixed to the shaft, a retarding gear member rotatable on the shaft, a gear wheel fixed to said retarding gear member, a gear carrier rotatable about the shaft, connected gear wheels journalled on the carrier and meshing respectively with the driving gear wheel, the master gear wheel and the gear wheel fixed to the retarding gear member for driving the driven member forwardly at speeds proportionate to restriction of freedom of rotation of the gear carrier when the retarding gear member is free to rotate and for driving the driven member reversely at speeds proportional to restriction of freedom of rotation of the retarding gear member when the gear carrier is free to rotate, and hydraulic means for selectively restricting freedom of rotation of the gear carrier and the retarding gear member.

5. A speed transforming mechanism including a driven member, a driving shaft extending through the driven member, an actuator for the driven member freely rotatable on the shaft, a driving gear wheel fixed to said actuator, a master gear wheel fixed to the shaft, a retarding gear member rotatable on the shaft, a gear wheel fixed to said retarding gear member, a gear carrier rotatable about the shaft, connected gear wheels journalled on the carrier and meshing respectively with the driving gear wheel, the master gear wheel and the gear wheel fixed to the retarding gear member for driving the driven member forwardly at speed proportionate to restriction of freedom of rotation of the gear carrier when the retarding gear member is free to rotate and for driving the driven member reversely at speeds proportional to restriction of freedom of rotation of the retarding gear member when the gear carrier is free to rotate, common means for restricting freedom of rotation of the gear carrier and the retarding gear member, and means for selectively connecting said restricting means with the gear carrier and with the retarding gear member.

6. In apparatus of the character described, a unitary shaft, a driving member formed as a solid unit and loosely mounted on the shaft, a ring gear on the driving member, means for operably connecting the shaft with the driving member, a control mechanism including a shaft and a gear pinion fixed on said shaft and adapted to mesh with said ring gear, and clutch means for engaging or disengaging the gear pinion and ring gear.

7. A speed transforming mechanism including a driving shaft, a driven member, an actuator for the driven member freely rotatable on the shaft, a driving gear wheel fixed to said actuator, a master gear wheel fixed to the shaft, a retarding gear member rotatable on the shaft and including a bevel pinion, a gear wheel fixed to said retarding gear member, a gear carrier rotatable about the shaft, a ring gear on the carrier, connected gear wheels journalled on the carrier and meshing respectively with the driving gear wheel, the master gear wheel and the gear wheel fixed to the retarding gear member for driving the driven member forwardly at speeds proportionate to restriction of freedom of rotation of the gear carrier when the retarding gear member is free to rotate, and for driving the driven member reversely at speeds proportional to restriction of freedom of rotation of the retarding gear member when the gear carrier is free to rotate, a control mechanism including a shaft, pinions on said shaft adapted to mesh respectively with said bevel pinion and with said ring gear, and clutch means on said shaft for selectively engaging said pinions with said bevel pinion and ring gear.

8. Speed transforming mechanism including a driving shaft, a driven member, an actuator fixed to the driven member and freely rotatable on the shaft, a driving gear wheel fixed to said actuator, a master gear wheel fixed to the shaft, a gear carrier rotatable about the shaft, connected gear wheels journalled on the carrier and meshing respectively with the driving and master gear wheels for driving the driven member forwardly at speeds proportionate to restriction of freedom of rotation of the gear carrier, a control mechanism, and means permanently connected with the gear carrier and responsive to the control mechanism for effecting positive operation of the gear carrier at selected speeds.

9. Speed transforming mechanism including a driving shaft, a driven member, an actuator fixed to the driven member and rotatable independently of the shaft, a driving gear wheel fixed to said actuator, a master gear wheel fixed to the shaft, a retarding gear member rotatable on the shaft, a gear wheel fixed to said retarding gear member, a gear carrier rotatable about the shaft, connected gear wheels journalled on the carrier and meshing respectively with the driving gear wheel, the master gear wheel, and the gear wheel fixed to the retarding gear member for driving the driven member reversely at speeds proportional to restriction of freedom of rotation of the retarding gear member, a control mechanism including a shaft, and a gear on the shaft meshing with the gear on the retarding gear member and responsive to the control mechanism for permitting operation of the retarding gear member at selected speeds.

10. In apparatus of the character described, a unitary shaft, a driving member formed as a solid unit and loosely mounted on the shaft, a ring gear on the driving member, a retarding gear member rotatably mounted within said unit and operably connected with the driving member, a control mechanism including a shaft and gear pinions fixed on said shaft and adapted to mesh respectively with said ring gear and retarding gear, and clutch means for selectively engaging or disengaging the gear pinions and said ring and retarding gears.

In testimony whereof we affix our signatures.

GEORGE KRELL.
GUY M. MARTINET.